(12) United States Patent
Clerckx et al.

(10) Patent No.: US 7,764,746 B2
(45) Date of Patent: Jul. 27, 2010

(54) USER TERMINAL AND BASE STATION USING ADAPTED CODEBOOK ACCORDING TO POLARIZATION

(75) Inventors: Bruno Clerckx, Yongin-si (KR); Sung Jin Kim, Suwon-si (KR); Ki Il Kim, Seongnam-si (KR); David J. Love, West Lafayette, IN (US); Taejoon Kim, West Lafayette, IN (US)

(73) Assignees: Samsung Electronics Co., Ltd., Suwon-si (KR); Purdue Research Foundation, West Lafayette, IN (US)

( * ) Notice: Subject to any disclaimer, the term of this patent is extended or adjusted under 35 U.S.C. 154(b) by 34 days.

(21) Appl. No.: 12/193,913

(22) Filed: Aug. 19, 2008

(65) Prior Publication Data
US 2010/0045494 A1 Feb. 25, 2010

(51) Int. Cl.
*H04B 7/02* (2006.01)

(52) U.S. Cl. .................................. 375/267; 341/106
(58) Field of Classification Search ........... 341/50–115; 380/278; 370/203; 375/206, 260, 267, 302
See application file for complete search history.

(56) References Cited

U.S. PATENT DOCUMENTS 7,590,204 B2 * 9/2009 Monsen ...................... 375/350

* cited by examiner

*Primary Examiner*—Lam T Mai
(74) *Attorney, Agent, or Firm*—NSIP Law

(57) ABSTRACT

A terminal and a base station using an adaptive codebook for a polarization are provided. The terminal includes a rotation matrix generator to generate rotation matrices corresponding to a cross polarization discrimination value (XPD) of a transmission signal and a codebook generator to generate a codebook including result matrices that are generated based on pre-stored block diagonal matrices and the rotation matrices.

22 Claims, 6 Drawing Sheets

USER TERMINAL AND BASE STATION USING ADAPTED CODEBOOK ACCORDING TO POLARIZATION

TECHNICAL FIELD

The following description relates to an apparatus and a communication system using a codebook, and more particularly, to an apparatus and a multiple-input multiple-output (MIMO) communication system using an adaptively generated codebook consistent with a polarization.

BACKGROUND

A number of researches are being conducted to provide various types of multimedia services such as a voice service and to support high quality and high speed of data transmission in a wireless communication environment. Technologies associated with a multiple-input multiple-output (MIMO) communication system using multiple channels are in rapid development.

In a MIMO communication system, a base station and terminals may adopt a codebook in order to effectively use channel information and the like. A particular space may be quantized into a plurality of vectors. The plurality of vectors that is generated by quantizing the particular space according to a predetermined standard may be stored in the base station and the terminals as the codebook.

For example, each of the terminals may select any one matrix or vector from matrices or vectors included in the codebook, based on a channel that is formed between the base station and each of the terminals. The base station may also receive the selected matrix or vector to thereby identify the channel information based on the codebook. The selected matrix or vector may be used when the base station generates a transmission signal.

Researches regarding effective codebook design schemes where the transmission signal is single-polarized are being conducted. However, researches associated with determining a type of codebook to improve the throughput of a communication system where the transmission signal is multi-polarized have been insufficient so far. Accordingly, there is a need for an effective codebook design method where a transmission signal is multi-polarized.

SUMMARY

In one general aspect, there is provided a terminal and a base station for adaptively generating a codebook according to a cross discrimination value (XPD) and using the generated codebook. Accordingly, the throughput of a communication system may be improved.

In another general aspect, there is provided a terminal and a base station for using a codebook suitable for a channel environment. Accordingly, a data transmission rate may be improved.

In still another general aspect, there is provided a terminal comprising a rotation matrix generator to generate rotation matrices corresponding to an XPD of a transmission signal and a codebook generator to generate a codebook including result matrices that are generated based on pre-stored block diagonal matrices and the rotation matrices.

Each of the block diagonal matrices may comprise single polarized preceding matrices in diagonal blocks and comprise zero matrices in remaining blocks.

The rotation matrix generator may select the rotation matrices corresponding to the XPD of the transmission signal from a plurality of pre-stored candidate rotation matrices.

The rotation matrix generator may generate the rotation matrices based on a distortion measurement value between the rotation matrices.

The block diagonal matrices may be selected and are pre-stored based on a chordal distance between the block diagonal matrices.

The terminal may further comprise an XPD calculator to calculate the XPD of the transmission signal based on a channel matrix of a channel formed between the terminal and a base station.

The codebook generator may perform an inner product for the block diagonal matrices and the rotation matrices to generate the result matrices, and generate the codebook.

Each of the block diagonal matrices may be determined based on a number of polarization directions of the transmission signal.

The terminal may further comprise a feedback unit to feed back information associated with at least one preferred matrix to a base station according to first feedback bits corresponding to a number of the rotation matrices and second feedback bits corresponding to a number of the block diagonal matrices, wherein the preferred matrix is selected from the result matrices In yet another general aspect, there is provided a terminal comprising an XPD calculator to calculate an XPD of a transmission signal based on a channel matrix of a channel formed between the terminal and a base station, a matrix selector to select result matrices corresponding to the calculated XPD from pre-stored matrices, and a feedback unit to feed back, to the base station, information associated with a preferred matrix selected from the result matrices.

The result matrices may be expressed as an inner product between predetermined block diagonal matrices and rotation matrices corresponding to the XPD, and each of the block diagonal matrices may comprise single polarized precoding matrices in diagonal blocks and comprise zero matrices in remaining blocks.

The feedback unit may feed back the information associated with the preferred matrix according to first feedback bits corresponding to a number of the block diagonal matrices and second feedback bits corresponding to a number of the rotation matrices.

In yet another general aspect, there is provided a base station comprising an XPD recognition unit to recognize an XPD of a transmission signal, a codebook detector to detect result matrices included in a codebook used by a terminal, based on the XPD, and a precoder to precode at least one data stream based on a precoding matrix selected from the result matrices.

The codebook detector may select the result matrices corresponding to the XPD from pre-stored matrices.

The codebook detector may detect the result matrices included in the codebook used by the terminal, based on rotation matrices corresponding to the XPD and pre-stored block diagonal matrices.

The base station may further comprise a feedback information receiver to receive, from the terminal, information associated with a preferred matrix selected by the terminal from the result matrices, wherein the information associated with the preferred matrix comprises first feedback bits corresponding to a number of rotation matrices corresponding to the XPD and second feedback bits corresponding to a number of pre-stored block diagonal matrices.

The precoder may precode the at least one data stream using the precoding matrix selected based on the information associated with the preferred matrix.

The recognition unit may recognize the XPD based on information associated with the XPD transmitted from the terminal, and the XPD may be measured by the terminal.

In yet another general aspect, there is provided a method of operating a terminal, the method comprising calculating an XPD of a transmission signal based on a channel matrix of a channel formed between the terminal and a base station, generating rotation matrices corresponding to the XPD, generating a codebook including results matrices that are generated based on pre-stored block diagonal matrices and the rotation matrices, and feeding back, to the base station, information associated with at least one preferred matrix according to first feedback bits corresponding to a number of the rotation matrices and second feedback bits corresponding to a number of the block diagonal matrices, wherein each of the block diagonal matrices comprises single polarized precoding matrices in diagonal blocks and comprises zero matrices in remaining blocks, and the preferred matrix is selected from the result matrices.

In yet another general aspect, there is provided a method of operating a base station, the method comprising recognizing an XPD of a transmission signal, detecting result matrices included in a codebook used by a terminal, based on the XPD, receiving, from the terminal, information associated with a preferred matrix selected by the terminal from the result matrices, and selecting a precoding matrix from the result matrices based on the information associated with the preferred matrix to precode at least one data stream based on the precoding matrix, wherein information associated with the preferred matrix comprises first feedback bits corresponding to a number of rotation matrices corresponding to the XPD and second feedback bits corresponding to a number of pre-stored block diagonal matrices.

Other features will become apparent to those skilled in the art from the following detailed description, which, taken in conjunction with the attached drawings, discloses exemplary embodiments of the invention.

BRIEF DESCRIPTION OF THE DRAWINGS

Throughout the drawings and the detailed description, unless otherwise described, the same drawing reference numerals will be understood to refer to the same elements, features, and structures.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses, and/or methods described herein will be suggested to those of ordinary skill in the art. Also, description of well-known functions and constructions are omitted to increase clarity and conciseness.

Figure 1:
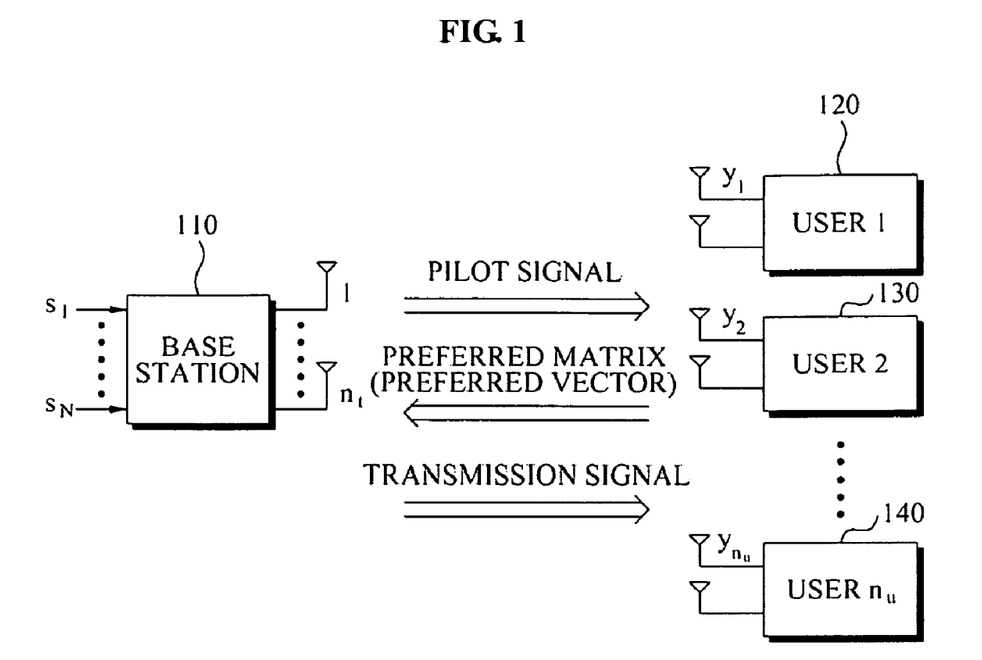
FIG. 1 is a diagram illustrating a multi-user multiple-input multiple-output (MIMO) communication system according to an exemplary embodiment.

FIG. 1 illustrates a multi-user multiple-input multiple-output (MIMO) communication system according to an exemplary embodiment.

The multi-user MIMO communication system includes a base station 110 and a plurality of users (user 1, user 2, user $n_u$) 120, 130, and 140. A plurality of antennas may be installed in the base station 110. A single antenna or a plurality of antennas may be installed in each of the users (user 1, user 2, user $n_u$) 120, 130, and 140. A channel may be formed between the base station 110 and each of the users (user 1, user 2, user $n_u$) 120, 130, and 140. The base station 110 may communicate with each of the users (user 1, user 2, user $n_u$) 120, 130, and 140 via the formed channel.

The base station 110 may transmit at least one data stream to the plurality of users (user 1, user 2, user $n_u$) 120, 130, and 140. The base station 110 may precode the data streams according to a spatial division multiplex access (SDMA) scheme to thereby generate a transmission signal. The base station 110 may select a precoding matrix from matrices included in a codebook and generate the transmission signal based on the selected precoding matrix.

The base station 110 may transmit pilot signals to the plurality of users (user 1, user 2, user $n_u$) 120, 130, and 140 via a downlink channel. The pilot signals may be well known to the base station 110 and the plurality of users (user 1, user 2, user $n_u$) 120, 130, and 140.

Each of the users (user 1, user 2, user $n_u$) 120, 130, and 140 may receive the pilot signal to estimate a channel formed between the base station 110 and the users (user 1, user 2, user $n_u$) 120, 130, and 140. Each of the users (user 1, user 2, user $n_u$) 120, 130, and 140 may select, as a preferred vector, any one vector from vectors included in a pre-stored codebook, or may select, as a preferred matrix, any one matrix from matrices included in the codebook, based on the estimated channel.

For example, the plurality of users (user 1, user 2, user $n_u$) 120, 130, and 140 may select, as the preferred vector or the preferred matrix, any one vector or matrix from $2^B$ vectors or matrices based on an achievable data transmission rate or a signal-to-interference and noise ratio (SINR). Each of the users (user 1, user 2, user $n_u$) 120, 130, and 140 may determine its own preferred transmission rank, which is a number of data streams.

Each of the users (user 1, user 2, user $n_u$) 120, 130, and 140 may feed back, to the base station 110, information associated with the selected preferred vector or the selected preferred matrix.

The base station 110 may receive information associated with the preferred vector or the preferred matrix of each of the users (user 1, user 2, user $n_u$) 120, 130, and 140 and may determine a precoding matrix. The base station 110 may select a portion of or all of the users (user 1, user 2, user $n_u$) 120, 130, and 140 depending on various types of selection algorithms such as a semi-orthogonal user selection (SUS) algorithm, a greedy user selection (GUS) algorithm, and the like.

The base station 110 may pre-store the same codebook as the codebook that is stored in the plurality of users (user 1, user 2, user $n_u$) 120, 130, and 140. The base station 110 may select the precoding matrix from matrices included in the pre-stored codebook, based on information associated with the preferred vector or the preferred matrix that is received from the plurality of users (user 1, user 2, user $n_u$) 120, 130, and 140. In this instance, the base station 110 may select the precoding matrix to maximize a total data transmission rate, that is, a sum rate.

The base station 110 may precode data streams $S_1$ and $S_N$ based on the selected precoding matrix to thereby generate the transmission signal. A process of generating the transmission signal by the base station 110 may be referred to as "beamforming."

However, the channel environment between the base station 110 and the plurality of users (user 1, user 2, user $n_u$) 120, 130, and 140 may vary. Where the base station and the plurality of users (user 1, user 2, user $n_u$) 120, 130, and 140 use the same codebook, it may be difficult to adaptively cope with the varying channel environment.

In particular, where the transmission signal has at least two polarization directions, it may be ineffective to use a fixed codebook. Specifically, a cross polarization discrimination (XPD) of the transmission signal with at least two polarization directions may be varied according to various types of conditions such as a location of a terminal, a mobility, other channel environments, and the like. In this case, there may be a need to use a codebook most consistent with the XPD.

Figure 2:
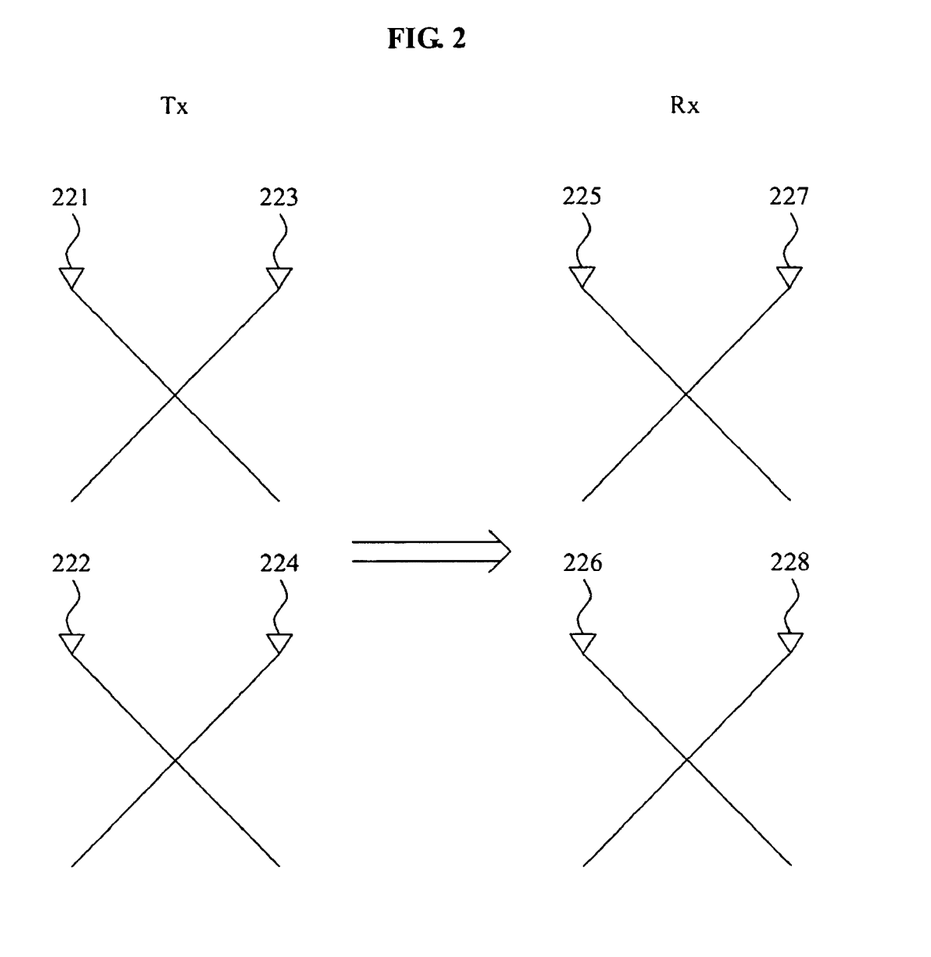
FIG. 2 is a diagram illustrating a plurality of transmit antennas and a plurality of receive antennas according to an exemplary embodiment.

FIG. 2 illustrates a plurality of transmit antennas and a plurality of receive antennas according to an exemplary embodiment.

As illustrated in FIG. 2, four transmit antennas 221, 222, 223, and 224 may be installed in a base station (not shown) and four receive antennas 225, 226, 227, and 228 may be installed in a terminal (not shown). A wireless channel may be formed between the four transmit antennas 221, 222, 223, and 224 and the four receive antennas 225, 226, 227, and 228. The transmission signal from the four transmit antennas 221, 222, 223, and 224 may be received at the four receive antennas 225, 226, 227, and 228.

Since two transmit antennas 221 and 222 are orthogonal to the remaining two transmit antennas 223 and 224, respectively, the polarization direction of signals transmitted from the two transmit antennas 221 and 222 are orthogonal to the polarization direction of signals transmitted from the two transmit antennas 223 and 224. The transmission signal from the four antennas 221, 222, 223, and 224 is dual polarized.

Generally, where the transmission signal is dual polarized, channel $H_\chi$ that is formed between the base station and the terminal may be modeled as given by, $$H_\chi = X \odot H_w, \quad \text{[Equation 1]}$$
$$X = \begin{bmatrix} 1 & \sqrt{\chi} \\ \sqrt{\chi} & 1 \end{bmatrix} \otimes \text{ones}\left(\frac{N_r}{2}, \frac{N_t}{2}\right),$$

where $H_w$ an independently and identically distributed Gaussian channel matrix with zero-mean and unit-variance, $\chi$ is a value in inverse proportion to an XPD where $0 \leq \chi \leq 1$, $\odot$ is Hadamard product, $\otimes$ is Kronecker product, ones(a,b) is an a×b matrix and all the elements of the matrix are "1", $N_r$ is a number of receive antennas, and $N_t$ is a number of transmit antennas.

Referring to the above Equation 1, the channel $H_\chi$ may be expressed using the XPD, or $\chi$ and $H_w$. Also, the terminal may estimate the channel $H_\chi$ using a pilot signal and the like to thereby readily recognize $\chi$ or the XPD. Also, the terminal may quantize the XPD or $\chi$ to feed back the same to the base station. Accordingly, the base station may also recognize $\chi$ or the XPD. For example, where $\chi$ is quantized with 1/N sections, the base station may receive feedback regarding $[\log_2 N]$ bits of index information or a total of $\chi$ from the terminal to thereby recognize the XPD or $\chi$.

Generally, as the distance from the base station to the terminal decreases, $\chi$ approaches "0". Conversely, as the distance increases, $\chi$ approaches "1". In particular, where polarization directions of the transmission signal are orthogonal to each other, $\chi$ is zero. In this case, matrices included in the codebook may be in the form of a block diagonal matrix, which will be hereinafter described.

Block Diagonal Matrix

Where the polarization directions of the transmission signal are orthogonal to each other, $\chi$ may be modeled as zero. Channel matrix $H_\chi$ may be expressed as, $$H_{\chi=0} \equiv H_D = \begin{bmatrix} H_{11} & 0 \\ 0 & H_{22} \end{bmatrix}. \quad \text{[Equation 2]}$$

Here, where $\chi$ is zero, the channel matrix $H_\chi$ may be in the form of a block diagonal matrix.

In this case, each of block diagonal matrices includes a plurality of blocks corresponding to a number of the polarization directions of the transmission signal. For example, where one polarization direction is vertical and the remaining one polarization direction is horizontal, each of the block diagonal matrices may include four blocks. The four blocks may consist of two diagonal blocks and two remaining blocks.

According to an aspect, the diagonal blocks of the block diagonal matrix may include a single-polarized precoding matrix and the remaining blocks may include a zero matrix. The single-polarized precoding matrix may include a discrete Fourier transform (DFT) precoding matrix or a rotation DFT precoding matrix.

The block diagonal matrix is not required to be a square matrix. The size of the block diagonal matrix may be determined according to a transmission rank associated with a number of data streams to be transmitted. In this case, the transmission rank may not exceed the number of transmit antennas. For example, where the number of transmit antennas is four, the maximum transmission rank may be limited to four. Where the transmission rank is three, the block diagonal matrix may be a 4×3 matrix.

Where $\chi$ is zero and the transmission signal is dual polarized, the block diagonal matrix to be stored in the codebook according to an aspect may be expressed as, $$U^{(i)} = \begin{bmatrix} A & 0 \\ 0 & B \end{bmatrix}. \quad \text{Equation 3]}$$

Referring to the above Equation 3, since the transmission signal is dual polarized, the matrix $U^{(i)}$ to be stored in the codebook may include four blocks. If the transmission signal is polarized in three directions, the matrix $U^{(i)}$ may include nine blocks. The matrix $U^{(i)}$ is an $N_t \times M$ matrix where $N_t$ denotes a number of transmit antennas and M denotes the transmission rank.

A and B are allocated to diagonal blocks of the matrix $U^{(i)}$. In this case, A and B are single-polarized precoding matrices. A zero matrix is allocated to the remaining blocks.

Where the transmission signal is single polarized, a single polarized codebook may include a DFT codebook or a rotation DFT codebook. The DFT codebook may be expressed by the following Equation 4. The DFT codebook includes $2^B$ DFT precoding matrices.

$\gamma = \{U^{(0)}, U^{(1)}, \ldots, U^{(2^B-1)}\}$: DFT codebook $U^{(b)} = [u_0^{(b)} \ldots u_{M-1}^{(b)}]$: $b^{th}$ matrix to be stored in the DFT codebook $u_{m-1}^{(b)}$: $m^{th}$ column vector in $U^{(b)}$ [Equation 4]

$$u_m^{(b)} = \frac{1}{\sqrt{M}}[u_{0m}^{(b)} \ldots u_{(M-1)m}^{(b)}]^T$$

$$u_{nm}^{(b)} = \exp\left\{j\frac{2\pi n}{M}\left(m + \frac{b}{2^B}\right)\right\}$$

where B is a number of bits of feedback data to be fed back by the terminal and M is a number of transmit antennas.

For example, where the number of transmit antennas is two, the DFT preceding matrix may be any one of matrices as expressed by, $$\begin{bmatrix} 1 & 1 \\ j & -j \end{bmatrix}, \begin{bmatrix} 1 & 1 \\ 1 & -1 \end{bmatrix}. \quad [\text{Equation 5}]$$

Among four transmit antennas, where the polarized direction of two transmit antennas is orthogonal to the polarized direction of two remaining transmit antennas, the transmission rank is four, and $\chi$ is zero, the block diagonal matrix according to an aspect may be generated by variously combining two matrices as shown in the above Equation 5. For example, the block diagonal matrix may be any one of matrices as expressed by $$\begin{bmatrix} 1 & 1 & 0 & 0 \\ j & -j & 0 & 0 \\ 0 & 0 & 1 & 1 \\ 0 & 0 & j & -j \end{bmatrix}, \begin{bmatrix} 1 & 1 & 0 & 0 \\ 1 & -1 & 0 & 0 \\ 0 & 0 & 1 & 1 \\ 0 & 0 & 1 & -1 \end{bmatrix}, \ldots \quad [\text{Equation 6}]$$

In this case, although the transmission rank of the block diagonal matrices is four, the transmission rank may be varied. For example, where the transmission rank is two, block diagonal matrices according to an aspect may be expressed as, $$\begin{bmatrix} 1 & 1 \\ 1 & 1 \\ 0 & 0 \\ 0 & 0 \end{bmatrix}, \begin{bmatrix} 0 & 0 \\ 0 & 0 \\ 1 & 1 \\ 1 & -1 \end{bmatrix}, \begin{bmatrix} 1 & 0 \\ 1 & 0 \\ 0 & 1 \\ 0 & 1 \end{bmatrix}, \begin{bmatrix} 1 & 0 \\ 1 & 0 \\ 0 & 1 \\ 0 & -1 \end{bmatrix}, \begin{bmatrix} 1 & 0 \\ -1 & 0 \\ 0 & 1 \\ 0 & 1 \end{bmatrix}, \begin{bmatrix} 1 & 0 \\ -1 & 0 \\ 0 & 1 \\ 0 & -1 \end{bmatrix}. \quad [\text{Equation 7}]$$

The above six matrices of Equation 7 are in the form of the block diagonal matrices.

The single polarized preceding matrix may include a rotation DFT preceding matrix in addition to the DFT preceding matrix. A rotation DFT codebook including a plurality of rotation DFT preceding matrices may be expressed as, $\{E, E^2, \ldots, E^{2^B}\}$: rotation DFT codebook that is a set of rotation DFT preceding matrices [Equation 8]

$$E^{(i)} = \begin{bmatrix} e^{j\theta_0} & 0 & \ldots & 0 \\ 0 & e^{j\theta_1} & \ldots & 0 \\ \vdots & \vdots & \ddots & \vdots \\ 0 & 0 & \ldots & e^{j\theta_{M-1}} \end{bmatrix} DFT_M$$

where $DFT_M$ is a DFT preceding matrix.

Diagonal blocks of the block diagonal matrix according to an aspect may include rotation DFT preceding matrices as well as DFT preceding matrices. Therefore, A or B of the above Equation 3 may be the DFT preceding matrix or the rotation DFT preceding matrix.

Codebook used for $0 \leq \chi \leq 1$

Where $\chi$ is zero, channel matrix $H_\chi$ may be expressed as, $$H_{\chi=0} \equiv H_D \quad [\text{Equation 9}]$$

$$= \begin{bmatrix} H_{11} & 0 \\ 0 & H_{22} \end{bmatrix}$$

$$\stackrel{SVD}{=} \begin{bmatrix} U_{11} & 0 \\ 0 & U_{22} \end{bmatrix} \begin{bmatrix} \Sigma_{11} & 0 \\ 0 & \Sigma_{22} \end{bmatrix} \begin{bmatrix} V_{11}^* & 0 \\ 0 & V_{22}^* \end{bmatrix}$$

$$= U_D \sum_D V_D,$$

where SVD is a singular value decomposition.

In this case, where $\chi$ is not zero, that is, where a signal with specific polarization exists, the channel matrix $H_\chi$ may be expressed as, $$H_{\chi, 0 < \chi \leq 1} = X \Theta H_w \stackrel{SVD}{=} U_\chi \sum_\chi V_\chi^*. \quad [\text{Equation 10}]$$

$V_D$ and $V_\chi$ may be expressed using rotation matrix $\Theta_\chi$. In this case, remaining elements of the rotation matrix $\Theta_\chi$, excluding diagonal elements thereof, are '0' and the amplitude of the diagonal elements is '1'. Specifically, $\overline{V}_D$ and $\overline{V}_\chi$ including first M columns vectors of $V_D$ and $V_\chi$ may be expressed as, $$\overline{V}_\chi = \Theta_\chi \overline{V}_D, \quad [\text{Equation 11}]$$

where M is a transmission rank, and elements of $\Sigma_D$ and $\Sigma_\chi$ are sorted in a descending order.

It may be known from the above Equation 11 that $V_\chi$ may be induced by performing an inner product for the rotation matrix $\Theta_\chi$ in $V_D$ corresponding to right singular matrices. Accordingly, where the transmission signal has the multi-polarization, it is possible to generate a codebook consistent with the actual $\chi$ by using the rotation matrix $\Theta_\chi$ and block diagonal matrices. Specifically, it is possible to adaptively generate a new codebook corresponding to a measured $\chi$ by performing an inner product for the rotation matrix $\Theta_\chi$ that is calculated according to the measured $\chi$ and the pre-stored block diagonal matrices.

Herein, it is assumed that a first codebook consisting of a plurality of block diagonal matrices is $\{U_D\} = \{U_{D,1}, \ldots, U_{D,2^{B2}}\}$, and a second codebook consisting of a plurality of rotation matrices is $\{\Theta_\chi\}=\{\Theta_{\chi,1}, \ldots, \Theta_{\chi,2^{B1}}\}$. The new codebook corresponding to the measured $\chi$ may be expressed as, $$\{F\}=\{F_1 F_2 \ldots F_{2^B}\}=\{\Theta_{\chi,1}\{U_D\} \ldots \Theta_{\chi,2^{B1}}\{U_D\}\}. \quad \text{[Equation 12]}$$

where B=B1+B2.

Referring to the above Equation 12, a base station or a terminal according to an aspect may generate $\{\Theta_\chi\}=\{\Theta_{\chi,1}, \ldots, \Theta_{\chi,2^{B1}}\}$ according to $\chi$. The terminal or the base station may dynamically calculate $\{\Theta_\chi\}=\{\Theta_{\chi,1}, \ldots, \Theta_{\chi,2^{B1}}\}$ according to the measured $\chi$ and may also extract $\{\Theta_\chi\}=\{\Theta_{\chi,1}, \ldots, \Theta_{\chi,2^{B1}}\}$ from a table stored in a memory.

Also, the base station or the terminal may generate a new codebook $\{F\}$ based on pre-stored block diagonal matrices $\{U_D\}=\{U_{D,1}, \ldots, U_{D,2^{B2}}\}$ and $\{\Theta_\chi\}=\{\Theta_{\chi,1}, \ldots, \Theta_{\chi,2^{B1}}\}$ that is generated according to $\chi$.

The new codebook $\{F\}$ includes $2^{(B1+B2)}=2^B$ matrices. Therefore, where the terminal selects any one matrix from $2^B$ matrices as a preferred matrix, the terminal may feed back B bits of information associated with the preferred matrix to the base station. Specifically, B-bit information associated with the preferred matrix may include index information (B1 bits) associated with the preferred matrix and index information (B2 bits) associated with the block diagonal matrix.

Optimization of Codebook

There may exist some difference between a channel capacity $C_{perfect\_channel}$ where a channel may be completely verified and a channel capacity $C_{quantized}$ in a limited feedback environment. The difference may be a distortion function and be expressed as, $$D = C_{Perfect\_channel} - C_{quantized} \quad \text{[Equation 13]}$$

$$= \log_2 \det\left(I_M + \frac{SNR}{M}\overline{V}_D^* \Theta_x^* H^* H \Theta_x \overline{V}_D\right) -$$

$$\log_2 \det\left(I_M + \frac{SNR}{M}\overline{U}_{D,i}^* \Theta_{x,j}^* H^* H \Theta_{x,j} \overline{U}_{D,i}\right)$$

The distortion function D may have an upper bound as given by, $$D \leq \alpha(2d_1(\overline{V}_D, U_j) + M \cdot d_2(\Theta_x, \Theta_{x,i})) \cdot \quad \text{[Equation 14]}$$

$$\left(E_H\left[\prod_{m=1}^{M}\left(1+\frac{SNR}{M}\lambda_m^2\right)\right]+\right.$$

$$\left.\sqrt{2\text{var}_H\left[\prod_{m=1}^{M}\left(1+\frac{SNR}{M}\lambda_m^2\right)\right]}\right)$$

where $\alpha$ is a constant, $\lambda_m$ is an $m^{th}$ unique value, SNR is a signal-to-noise ratio, M is a transmission rank, $$d_1(\overline{V}_D, U_j) = \sqrt{\frac{1}{2}}\sqrt{M - E_H\left[\max_{U_j \in u_D}\sum_{k=1}^{M}|\overline{V}_D U_j^{(k)}|^2\right]},$$

$$d_2(\Theta_x, \Theta_{x,i}) = \sqrt{N_t - E_H\left[\max_{\Theta_i \in Q}|tr(\Theta_x \Theta_i)|\right]},$$

and tr( ) is a trace function.

Referring to the above Equation 14, it is possible to design a first codebook that includes optimized block diagonal matrices with $d_1(\overline{V}_D, U_j)$. Also, it is possible to design a second codebook that includes optimized rotation matrices with $d_2(\Theta_\chi, \Theta_{\chi,i})$.

Hereinafter, a design process of the optimized first codebook and second codebook and a design process of a new codebook will be described.

The first codebook including the optimized block diagonal matrices may be designed according to the following Equation 15, $$\Omega_D \equiv \{U_D \in C^{N_t \times M} \mid U_D^* U_D = I_M \quad \text{[Equation 15]}$$

and $U_D$ is block diagonal matrix$\}$ $$\{U_D\} = \underset{\{U_D\} \subset \Omega_D}{\text{argmax}} \min_{\{i,j\}} d_{1,Chordal}(U_{D,i}, U_{D,j}).$$

Referring to the above Equation 15, it is possible to determine the first codebook including a portion of block diagonal matrices among a plurality of block diagonal matrices included in $\Omega_D$. Specifically, the portion of block diagonal matrices may be selected to maximize the minimal chordal distance between the plurality of block diagonal matrices, and a set of the selected block diagonal matrices may be determined as the optimized first codebook.

The second codebook including the optimized block diagonal matrices may be designed according to the following Equation 16.

$$Q \equiv \{\Theta_{x,i} \in C^{N_t \times N_t} \mid \Theta_{x,i} \Theta_{x,i}^* = I \quad \text{[Equation 16]}$$

and $\Theta_{x,i} \overline{V}_D = \overline{V}_x\}$ $$\{\theta\} = \underset{\{\theta\} \subset Q}{\text{argmax}} \min_{\{i,j\}} d_2(\Theta_{x,i}, \Theta_{x,j})$$

$$d_2(\Theta_i, \Theta_j) = \sqrt{N_t - |tr(\Theta_i^* \Theta_j)|^2},$$

$$\{\theta\} = \{\Theta_1, \ldots, \Theta_{2^{B_1}}\}.$$

Referring to the above Equation 16, it is possible to determine the second codebook including a portion of rotation matrices among a plurality of rotation matrices included in Q. Specifically, the portion of rotation matrices may be selected to maximize a distortion measure value $d_2$ between the plurality of rotation matrices, and a set of the selected rotation matrices may be determined as the optimized second codebook.

The new codebook may be determined based on the optimized first codebook and second codebook. Where $0 \leq \chi \leq 1$, the new codebook may be generated according to $\chi$, using the following Equation 17, $$\{F\}=\{F_1 F_2 \ldots F_{2^B}\}=\{\Theta_{\chi,1}\{U_D\} \ldots \Theta_{\chi,2^{B1}}\{U_D\}\}.$$

$$\{U_D\}=\{U_{D,1}, \ldots, U_{D,2^{B2}}\}, \{\Theta_\chi\}=\{\Theta_{\chi,1}, \ldots, \Theta_{\chi,2^{B1}}\}, \quad \text{[Equation 17]}$$

where B=B1+B2.

Accordingly, the terminal or the base station according to an aspect may generate the new codebook $\{F\}$ based on pre-stored block diagonal matrices $\{U_D\}=\{U_{D,1}, \ldots, U_{D,2^{B2}}\}$ and $\{\Theta_\chi\}=\{\Theta_{\chi,2}, \ldots, \Theta_{\chi,2^{B1}}\}$ that is generated according to $\chi$.

Also, the new codebook $\{F\}$ includes $2^{(B1+B2)}=2^B$ matrices. Where the terminal selects any one matrix from $2^B$ matrices as a preferred matrix, the terminal may feed back B bits of information associated with the preferred matrix to the base station. Specifically, B-bit information associated with the preferred matrix may include index information associated with the preferred matrix and index information associated with the block diagonal matrix.

Figure 3:
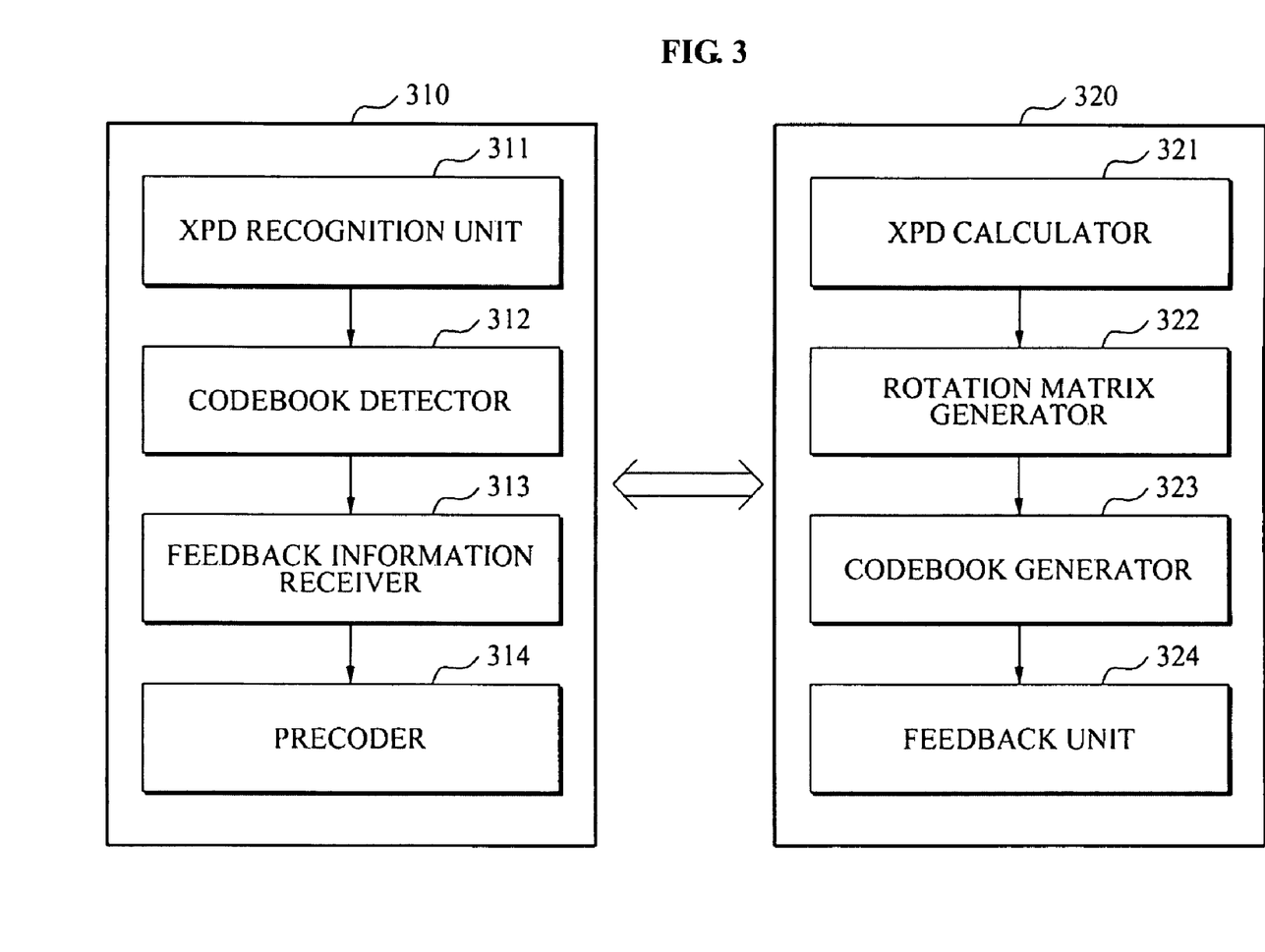
FIG. 3 is a block diagram illustrating a base station and a terminal according to an exemplary embodiment.

FIG. 3 illustrates a base station 310 and a terminal 320 according to an exemplary embodiment.

The base station 310 includes an XPD recognition unit 311, a codebook detector 312, a feedback information receiver 313, and a precoder 314. The terminal 320 includes an XPD calculator 321, a rotation matrix generator 322, a codebook generator 323, and a feedback unit 324.

The terminal 320 may estimate a channel formed between the base station 310 and the terminal 320. The XPD calculator 321 may calculate an XPD of a transmission signal based on a channel matrix of the estimated channel.

The rotation matrix generator 322 may generate a rotation matrix corresponding to the calculated XPD of the transmission signal. The rotation matrix generator 322 may select rotation matrices corresponding to the calculated XPD from a plurality of pre-stored candidate rotation matrices. Specifically, where any one set corresponding to the calculated XPD is selected from sets of the pre-stored candidate rotation matrices, candidate rotation matrices included in the selected set may be selected as the rotation matrices.

The terminal 320 may feed back index information of the selected rotation matrices to the base station 310 so that the base station 310 may verify the selected rotation matrices.

The rotation matrix generator 322 may generate the rotation matrices based on a distortion measurement value between the candidate rotation matrices.

The codebook generator 323 may perform an inner product for pre-stored block diagonal matrices and the generated rotation matrices to thereby generate a new codebook including result matrices.

Although not illustrated in FIG. 3, the terminal 320 may select, as a preferred matrix, any one matrix from the result matrices included in the new codebook.

The feedback unit 324 may feed back information associated with at least one preferred matrix to the base station 310 according to first feedback bits corresponding to a number of the rotation matrices and second feedback bits corresponding to a number of the block diagonal matrices.

For example, where the number of block diagonal matrices is $2^{B2}$ and the number of generated rotation matrices is $2^{B1}$, $2^{B1+B2}$ result matrices may be generated. In this case, the feedback unit 324 may feed back (B=B1+B2) bits of information associated with the preferred matrix.

The XPD recognition unit 311 may recognize the XPD of the transmission signal calculated by the terminal 320.

The codebook detector 312 may reconstruct a codebook that is newly generated and used by the terminal according to the XPD. The codebook detector 312 may detect the result matrices included in the codebook.

In particular, the base station 310 may dynamically generate rotation matrices corresponding to the XPD. Also, the base station 310 may store, in a separate memory, rotation matrices corresponding to various XPDs. The base station 310 may extract, from the stored matrices, rotation matrices corresponding to the XPD calculated by the terminal 320. The base station 310 may verify result matrices, newly generated by the terminal 320, based on the extracted rotation matrices.

The feedback information receiver 313 may receive information associated with the preferred matrix from the terminal 320. Where a plurality of terminals exists, the feedback information receiver 313 may receive information associated with preferred matrices of each terminal.

The precoder 314 may select, as a precoding matrix, any one matrix from the detected result matrices. For example, in the case of a single user MIMO communication system, the precoder 314 may select the preferred matrix of the terminal 320 as the precoding matrix. In the case of a multi-user MIMO communication system, the precoder 314 may select, as a precoding matrix, any one matrix from the result matrices according to various types of algorithms.

Figure 4:
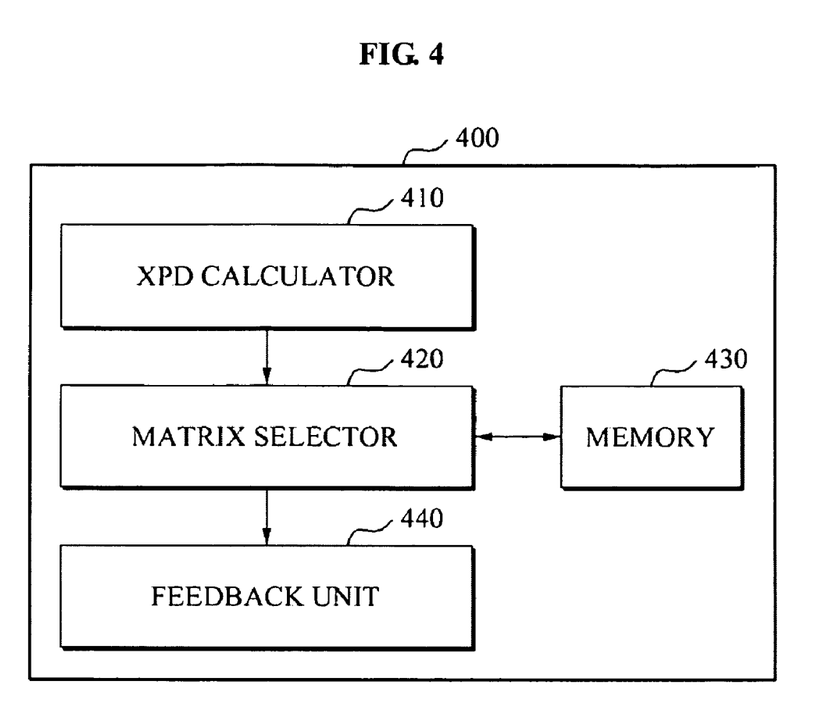
FIG. 4 is a block diagram illustrating a terminal according to an exemplary embodiment.

FIG. 4 illustrates a terminal 400 according to an exemplary embodiment.

The terminal 400 includes an XPD calculator 410, a matrix selector 420, a memory 430, and a feedback unit 440.

Operations of the XPD calculator 410 and the feedback unit 440 may be the same as the XPD calculator 321 and the feedback unit 324 of FIG. 3 and thus further descriptions will be omitted herein.

The memory 430 may pre-store sets of result matrices corresponding to an XPD. Where a number of block diagonal matrices is $2^{B2}$ and a number of rotation matrices corresponding to a particular XPD is $2^{B1}$, the memory 430 may pre-store a set of $2^{B1+B2}=2^B$ matrices that is generated by performing an inner product for the block diagonal matrices and the rotation matrices.

For example, three sets A, B, and C may be pre-stored in the memory 430. $2^{(B1+B2)}=2^B$ matrices may be included in each of the sets A, B, and C. Each of the sets A, B, and C corresponds to a different XPD.

The matrix selector 430 may select any one set from pre-stored sets of matrices according to a calculated XPD. Matrices included in the selected set may be result matrices, which may construct a new codebook.

The terminal 400 may select, as a preferred matrix, any one matrix from the matrices included in the new codebook and feed back index information of the preferred matrix to a base station.

Figure 5:
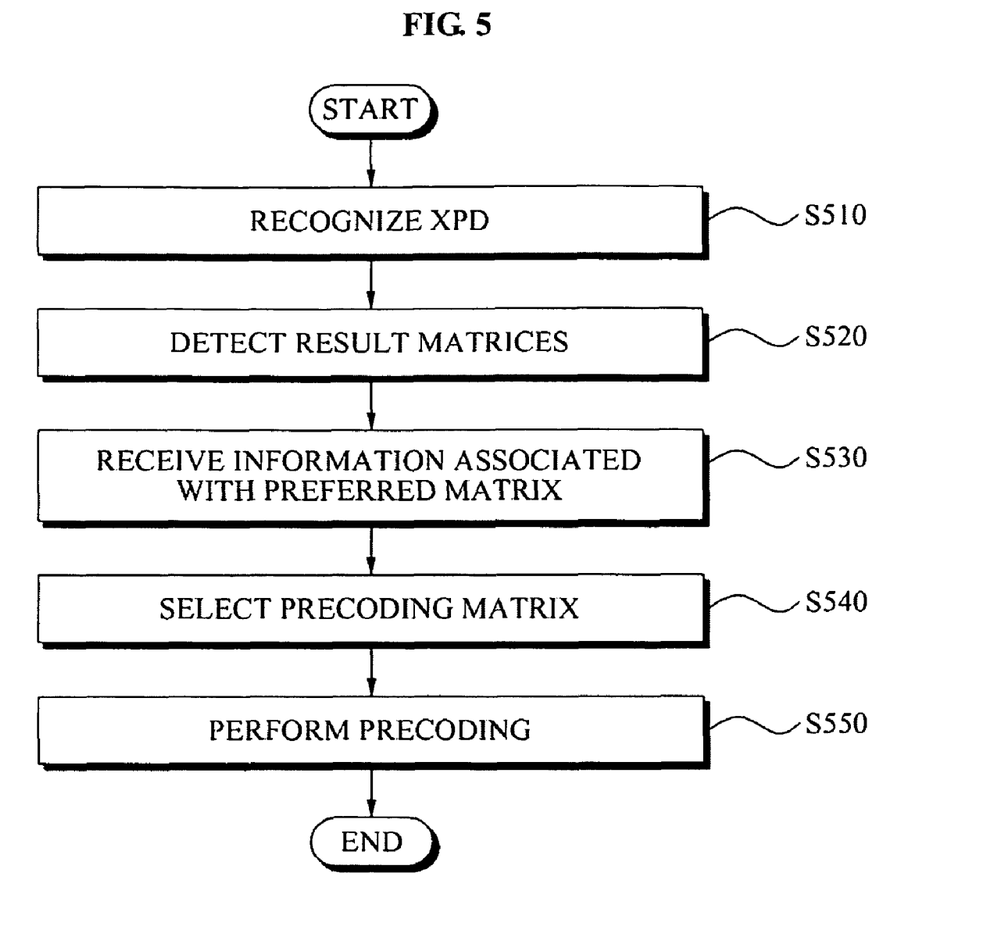
FIG. 5 is a flowchart illustrating a method of operating a base station according to an exemplary embodiment.

FIG. 5 illustrates a method of operating a base station according to an exemplary embodiment.

In operation S510, the base station may recognize an XPD of a transmission signal measured by a terminal.

In operation S520, the base station may detect result matrices included in a codebook used by the terminal, based on the XPD.

In operation S530, the base station may receive, from the terminal, information associated with the preferred matrix that is selected by the terminal from the result matrices.

In operation S540, the base station may select a precoding matrix from the result matrices based on information associated with the preferred matrix.

In operation S550, the base station may precode at least one data stream based on the precoding matrix.

Figure 6:
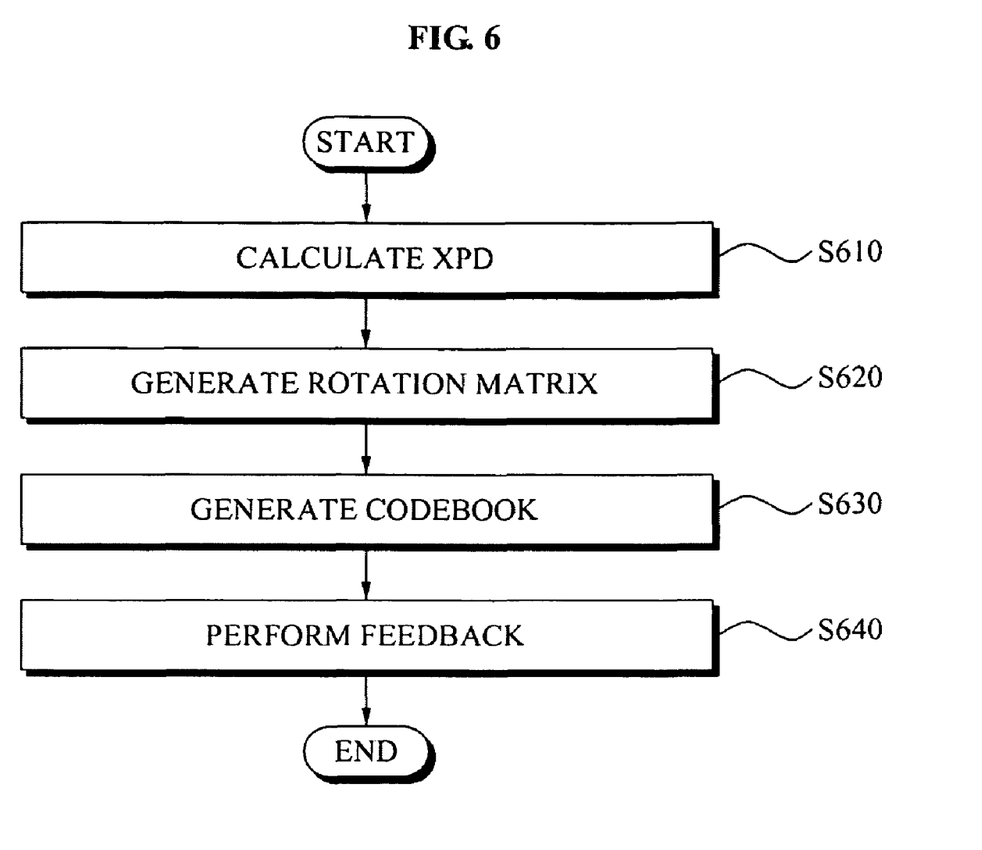
FIG. 6 is a flowchart illustrating a method of operating a terminal according to an exemplary embodiment.

FIG. 6 illustrates a method of operating a terminal according to an exemplary embodiment.

In operation S610, the terminal may calculate an XPD of a transmission signal based on a channel matrix of a channel formed between the terminal and a base station.

In operation S620, the terminal may generate rotation matrices corresponding to the XPD.

In operation S630, the terminal may generate a codebook including results matrices that are generated based on pre-stored block diagonal matrices and the rotation matrices.

In operation S640, the terminal may feed back, to the base station, information associated with at least one preferred matrix according to first feedback bits corresponding to a number of the rotation matrices and second feedback bits corresponding to a number of the block diagonal matrices.

Each of the operations of FIGS. 5 and 6 may be further understood with the descriptions made above with respect to FIGS. 1 through 4, and thus, additional descriptions will be omitted herein.

The methods described above including certain operation methods of a base station and a terminal may be recorded, stored, or fixed in one or more computer-readable media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A terminal comprising:
    a rotation matrix generator to generate rotation matrices corresponding to a cross polarization discrimination value (XPD) of a transmission signal; and
    a codebook generator to generate a codebook including result matrices that are generated based on pre-stored block diagonal matrices and the rotation matrices.

2. The terminal of claim 1, wherein the rotation matrix generator selects the rotation matrices corresponding to the XPD of the transmission signal from a plurality of pre-stored candidate rotation matrices.

3. The terminal of claim 1, wherein the rotation matrix generator generates the rotation matrices based on a distortion measurement value between the rotation matrices.

4. The terminal of claim 1, wherein the block diagonal matrices are selected and are pre-stored based on a chordal distance between the block diagonal matrices.

5. The terminal of claim 1, further comprising:
    an XPD calculator to calculate the XPD of the transmission signal based on a channel matrix of a channel formed between the terminal and a base station.

6. The terminal of claim 1, wherein the codebook generator performs an inner product for the block diagonal matrices and the rotation matrices to generate the result matrices, and generates the codebook.

7. The terminal of claim 1, wherein each of the block diagonal matrices is determined based on a number of polarization directions of the transmission signal.

8. The terminal of claim 1, further comprising:
    a feedback unit to feed back information associated with at least one preferred matrix to a base station according to first feedback bits corresponding to a number of the rotation matrices and second feedback bits corresponding to a number of the block diagonal matrices,
    wherein the preferred matrix is selected from the result matrices.

9. The terminal of claim 1, wherein each of the block diagonal matrices comprises single polarized precoding matrices in diagonal blocks and comprises zero matrices in remaining blocks.

10. A terminal comprising:
    an XPD calculator to calculate an XPD of a transmission signal based on a channel matrix of a channel formed between the terminal and a base station;
    a matrix selector to select result matrices corresponding to the calculated XPD from pre-stored matrices; and
    a feedback unit to feed back, to the base station, information associated with a preferred matrix selected from the result matrices.

11. The terminal of claim 10, wherein:
    the result matrices are expressed as an inner product between predetermined block diagonal matrices and rotation matrices corresponding to the XPD, and
    each of the block diagonal matrices comprises single polarized precoding matrices in diagonal blocks and comprises zero matrices in remaining blocks.

12. The terminal of claim 11, wherein the feedback unit feeds back the information associated with the preferred matrix according to first feedback bits corresponding to a number of the block diagonal matrices and second feedback bits corresponding to a number of the rotation matrices.

13. A base station comprising:
    an XPD recognition unit to recognize an XPD of a transmission signal;
    a codebook detector to detect result matrices included in a codebook used by a terminal, based on the XPD; and
    a precoder to precode at least one data stream based on a precoding matrix selected from the result matrices.

14. The base station of claim 13, wherein the codebook detector selects the result matrices corresponding to the XPD from pre-stored matrices.

15. The base station of claim 13, wherein the codebook detector detects the result matrices included in the codebook used by the terminal, based on rotation matrices corresponding to the XPD and pre-stored block diagonal matrices.

16. The base station of claim 13, further comprising:
    a feedback information receiver to receive, from the terminal, information associated with a preferred matrix selected by the terminal from the result matrices,
    wherein the information associated with the preferred matrix comprises first feedback bits corresponding to a number of rotation matrices corresponding to the XPD and second feedback bits corresponding to a number of pre-stored block diagonal matrices.

17. The base station of claim 16, wherein the precoder precodes the at least one data stream using the preceding matrix selected based on the information associated with the preferred matrix.

18. The base station of claim 13, wherein:
    the recognition unit recognizes the XPD based on information associated with the XPD transmitted from the terminal, and
    the XPD is measured by the terminal.

19. A method of operating a terminal, the method comprising:
- calculating an XPD of a transmission signal based on a channel matrix of a channel formed between the terminal and a base station;
- generating rotation matrices corresponding to the XPD;
- generating a codebook including results matrices that are generated based on pre-stored block diagonal matrices and the rotation matrices; and
- feeding back, to the base station, information associated with at least one preferred matrix according to first feedback bits corresponding to a number of the rotation matrices and second feedback bits corresponding to a number of the block diagonal matrices,
- wherein each of the block diagonal matrices comprises single polarized precoding matrices in diagonal blocks and comprises zero matrices in remaining blocks, and the preferred matrix is selected from the result matrices.

20. A method of operating a base station, the method comprising:
- recognizing an XPD of a transmission signal;
- detecting result matrices included in a codebook used by a terminal, based on the XPD;
- receiving, from the terminal, information associated with a preferred matrix selected by the terminal from the result matrices; and
- selecting a precoding matrix from the result matrices based on the information associated with the preferred matrix to precode at least one data stream based on the precoding matrix,
- wherein information associated with the preferred matrix comprises first feedback bits corresponding to a number of rotation matrices corresponding to the XPD and second feedback bits corresponding to a number of pre-stored block diagonal matrices.

21. A computer-readable storage medium storing a program to operate a terminal, comprising instructions to cause a computer to:
- calculate an XPD of a transmission signal based on a channel matrix of a channel formed between the terminal and a base station;
- generate rotation matrices corresponding to the XPD;
- generate a codebook including results matrices that are generated based on pre-stored block diagonal matrices and the rotation matrices; and
- feed back, to the base station, information associated with at least one preferred matrix according to first feedback bits corresponding to a number of the rotation matrices and second feedback bits corresponding to a number of the block diagonal matrices,
- wherein each of the block diagonal matrices comprises single polarized precoding matrices in diagonal blocks and comprises zero matrices in remaining blocks, and the preferred matrix is selected from the result matrices.

22. A computer-readable storage medium storing a program to operate a base station, comprising instructions to cause a computer to:
- recognize an XPD of a transmission signal;
- detect result matrices included in a codebook used by a terminal, based on the XPD;
- receive, from the terminal, information associated with a preferred matrix selected by the terminal from the result matrices; and
- select a precoding matrix from the result matrices based on the information associated with the preferred matrix to precode at least one data stream based on the precoding matrix,
- wherein information associated with the preferred matrix comprises first feedback bits corresponding to a number of rotation matrices corresponding to the XPD and second feedback bits corresponding to a number of pre-stored block diagonal matrices.

* * * * *